(12) United States Patent
Reber et al.

(10) Patent No.: US 7,307,256 B1
(45) Date of Patent: Dec. 11, 2007

(54) EXPLOSIVES DETECTION SYSTEM AND METHOD

(75) Inventors: Edward L. Reber, Idaho Falls, ID (US); James K. Jewell, Idaho Falls, ID (US); Kenneth W. Rohde, Idaho Falls, ID (US); Edward H. Seabury, Idaho Falls, ID (US); Larry G. Blackwood, Idaho Falls, ID (US); Andrew J. Edwards, Idaho Falls, ID (US); Kurt W. Derr, Idaho Falls, ID (US)

(73) Assignee: Battelle Energy Alliance, LC, Idaho Falls, ID (US)

( * ) Notice: Subject to any disclaimer, the term of this patent is extended or adjusted under 35 U.S.C. 154(b) by 154 days.

(21) Appl. No.: 11/100,800

(22) Filed: Apr. 6, 2005

(51) Int. Cl.
*G01J 5/02* (2006.01)
(52) U.S. Cl. .................................. 250/339.07
(58) Field of Classification Search ........... 250/339.07, 250/370.05, 390.01
See application file for complete search history.

(56) References Cited

U.S. PATENT DOCUMENTS 5,838,759 A * 11/1998 Armistead .................... 378/57
6,937,692 B2 * 8/2005 Johnson et al. ............... 378/57
2003/0201394 A1 * 10/2003 Peoples ...................... 250/336.1
2004/0232054 A1 * 11/2004 Brown et al. ................ 209/552
2005/0105681 A1 * 5/2005 Kang et al. ..................... 378/57
2005/0156734 A1 * 7/2005 Zerwekh et al. ........... 340/539.1

OTHER PUBLICATIONS

Webpage, "Gamma Ray Detector Experience", Western Kentucky Univ.; http://www.wku.edu/API/research/detectors/detectorexperience.htm; (Jan. 2005) 2 pages.
Chichester, David L., et al., Webpage; The Industrial Physicist; http://www.aip.org/tip/INPHEA/vol-9/iss-6/p22.html; (Jan. 2005), 6 pages.

* cited by examiner

*Primary Examiner*—David Porta
*Assistant Examiner*—Marcus H Taningco
(74) *Attorney, Agent, or Firm*—Wells St. John P.S.

(57) ABSTRACT

A method of detecting explosives in a vehicle includes providing a first rack on one side of the vehicle, the rack including a neutron generator and a plurality of gamma ray detectors; providing a second rack on another side of the vehicle, the second rack including a neutron generator and a plurality of gamma ray detectors; providing a control system, remote from the first and second racks, coupled to the neutron generators and gamma ray detectors; using the control system, causing the neutron generators to generate neutrons; and performing gamma ray spectroscopy on spectra read by the gamma ray detectors to look for a signature indicative of presence of an explosive. Various apparatus and other methods are also provided.

28 Claims, 20 Drawing Sheets

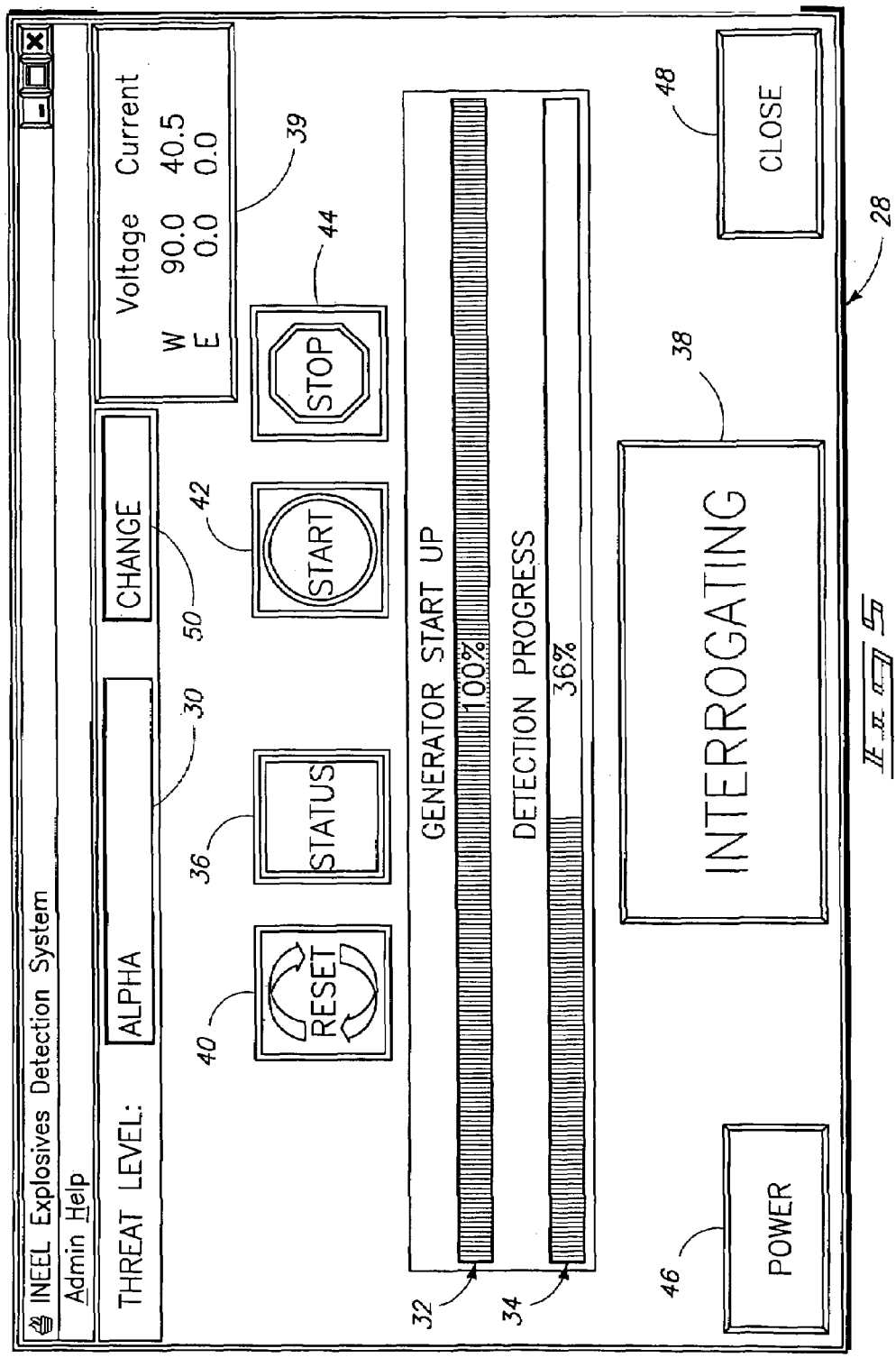

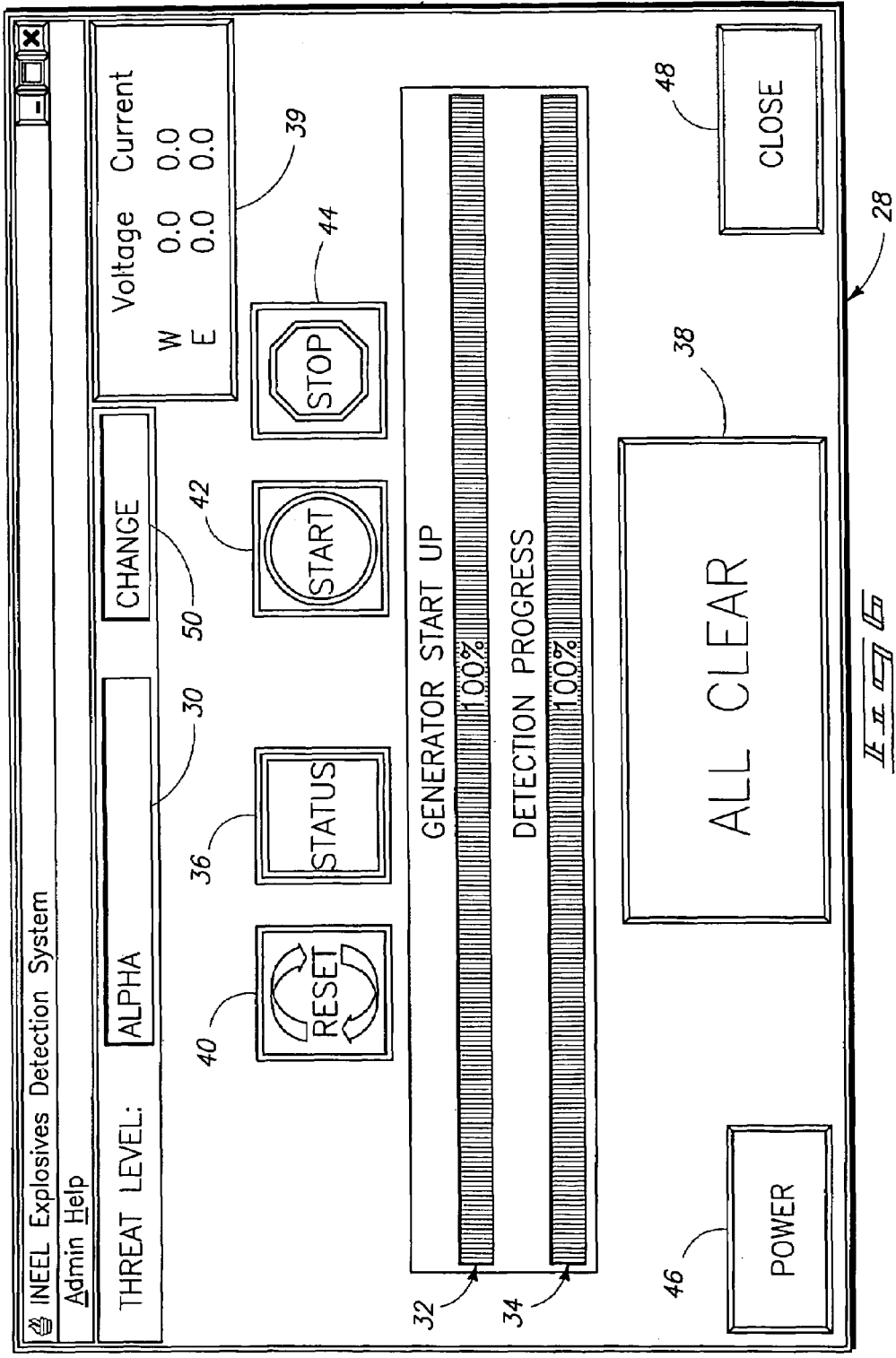

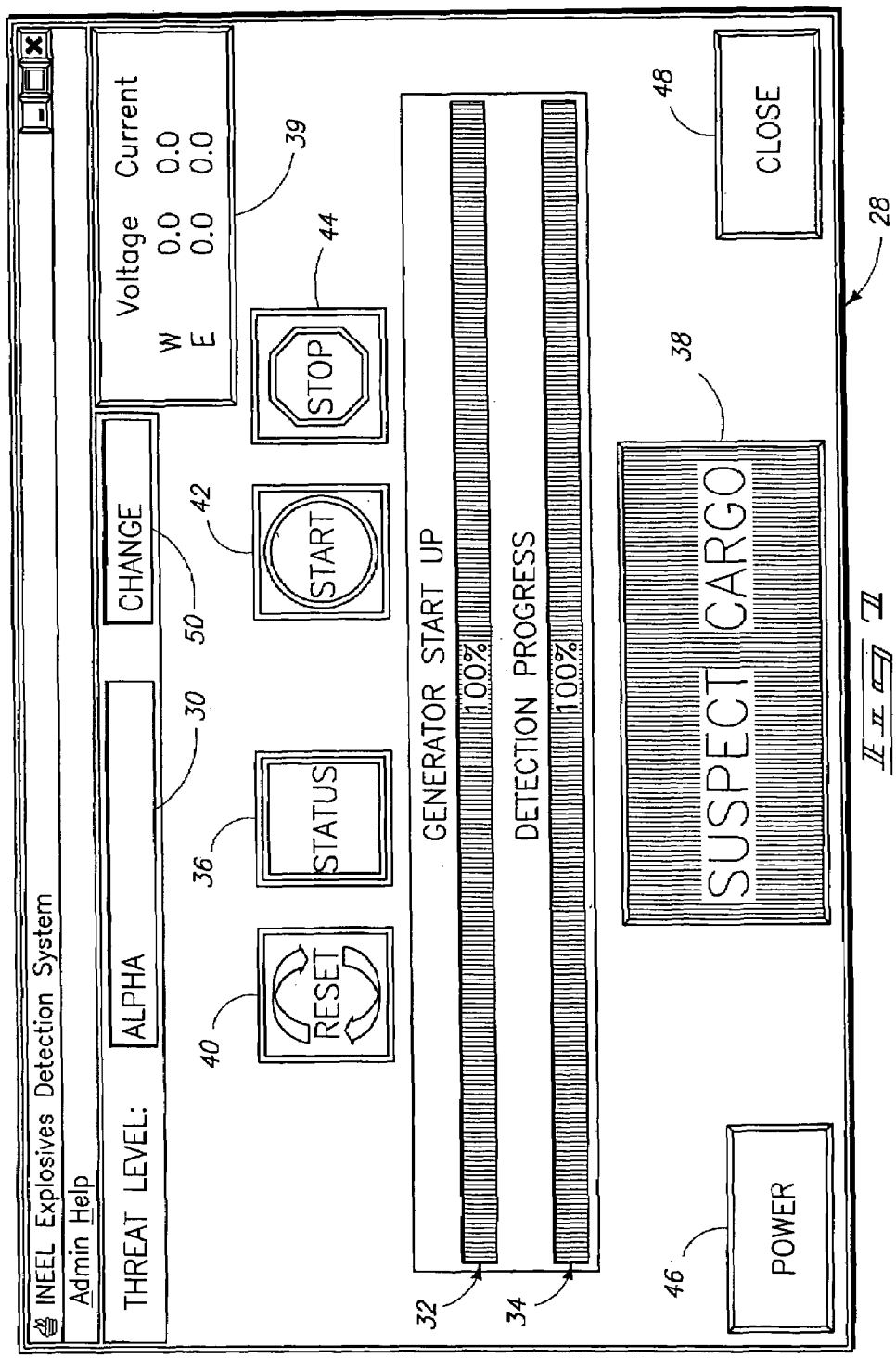

FIG. 8B

| | | | | | | | |
|---|---|---|---|---|---|---|---|
| 231 | 229 | 227 | 225 | | 216 | 214 | 212 | 210 |
| 232 | 230 | 228 | 226 | | 215 | 213 | 211 | 209 |

EAST — NG — TRUCK AREA — NG — WEST

TOP / BOTTOM (east side); BOTTOM / TOP (west side)

| 217 | 219 | 221 | 223 | | 208 | 206 | 204 | 202 |
| 218 | 220 | 222 | 224 | | 207 | 205 | 203 | 201 |

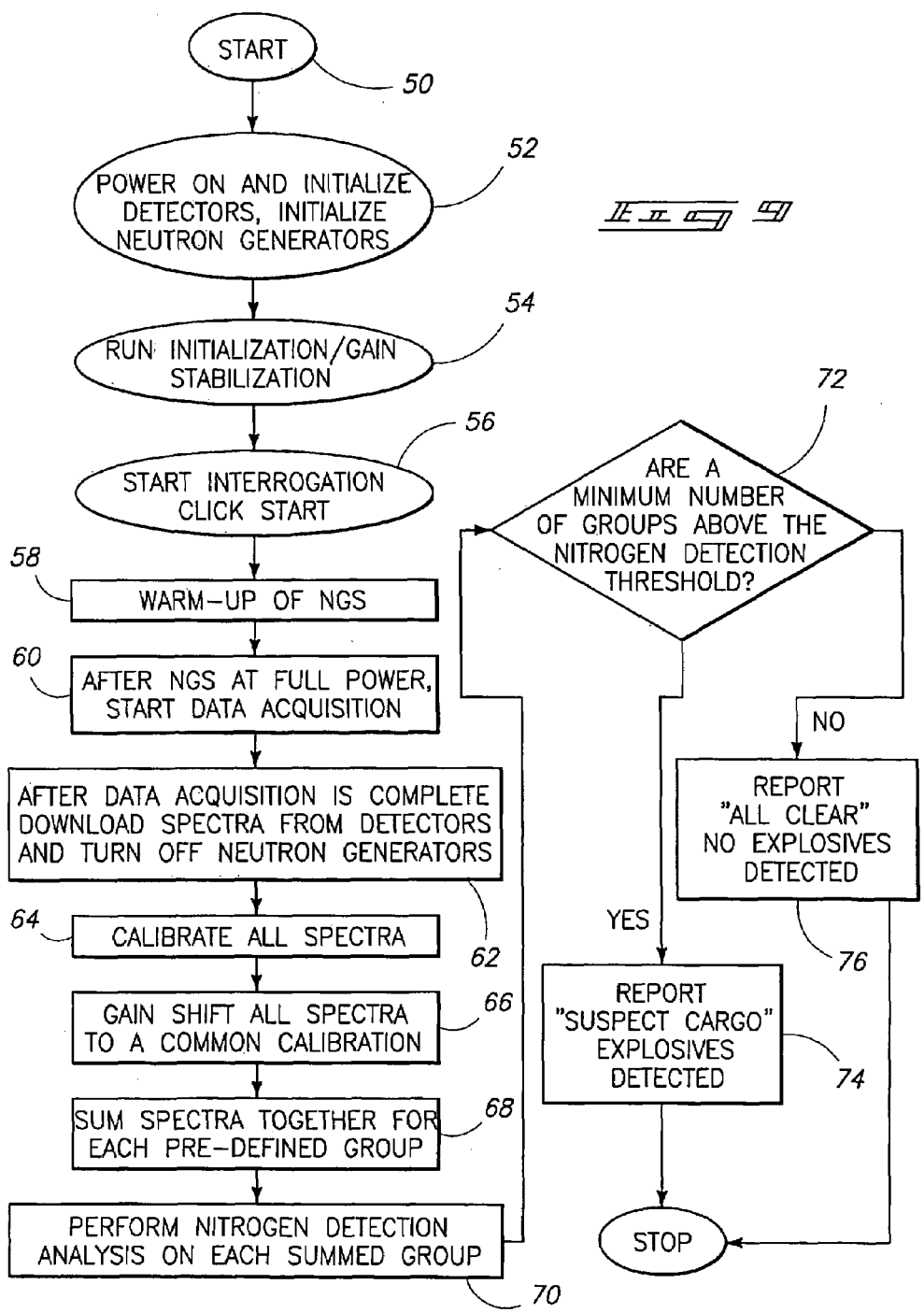

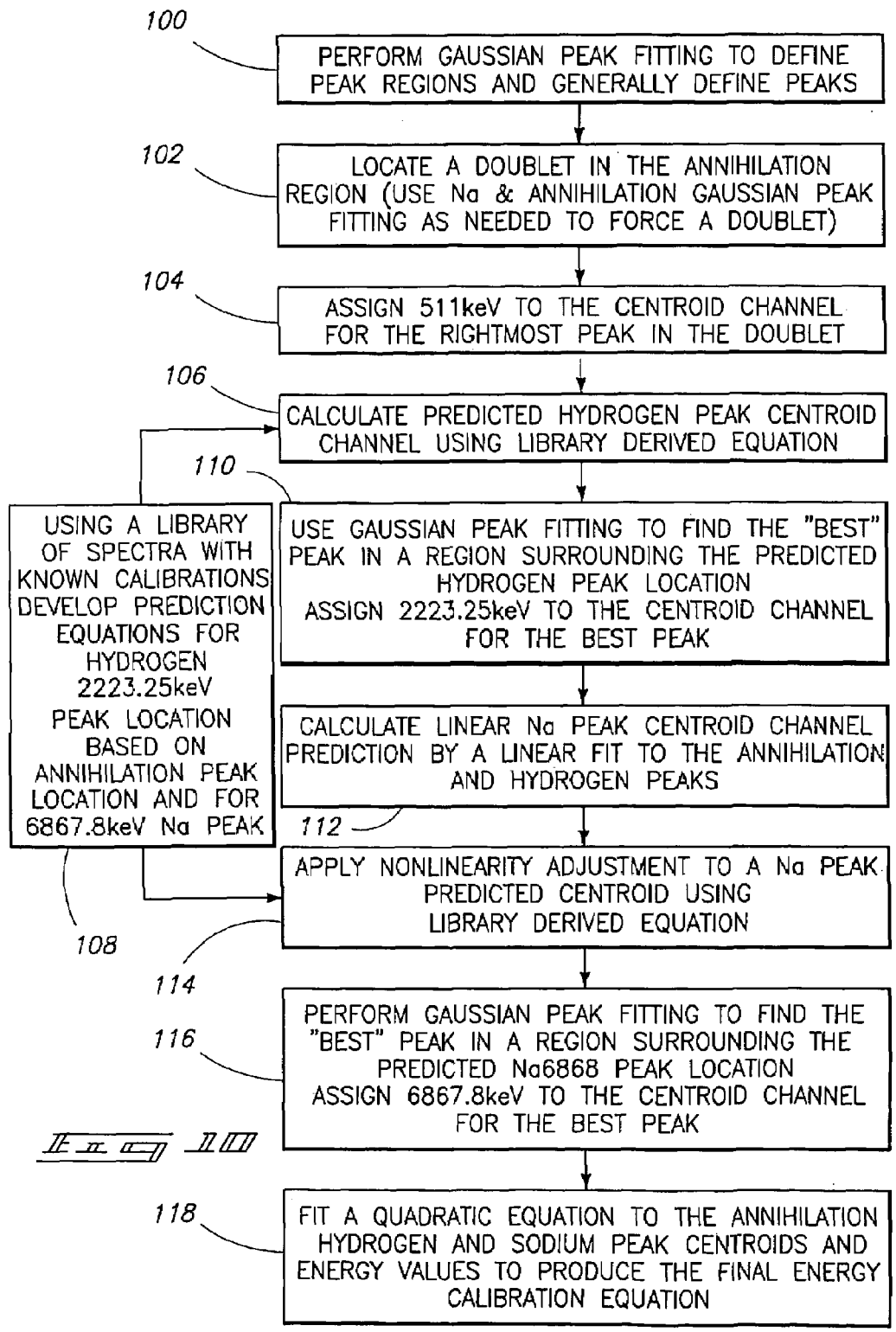

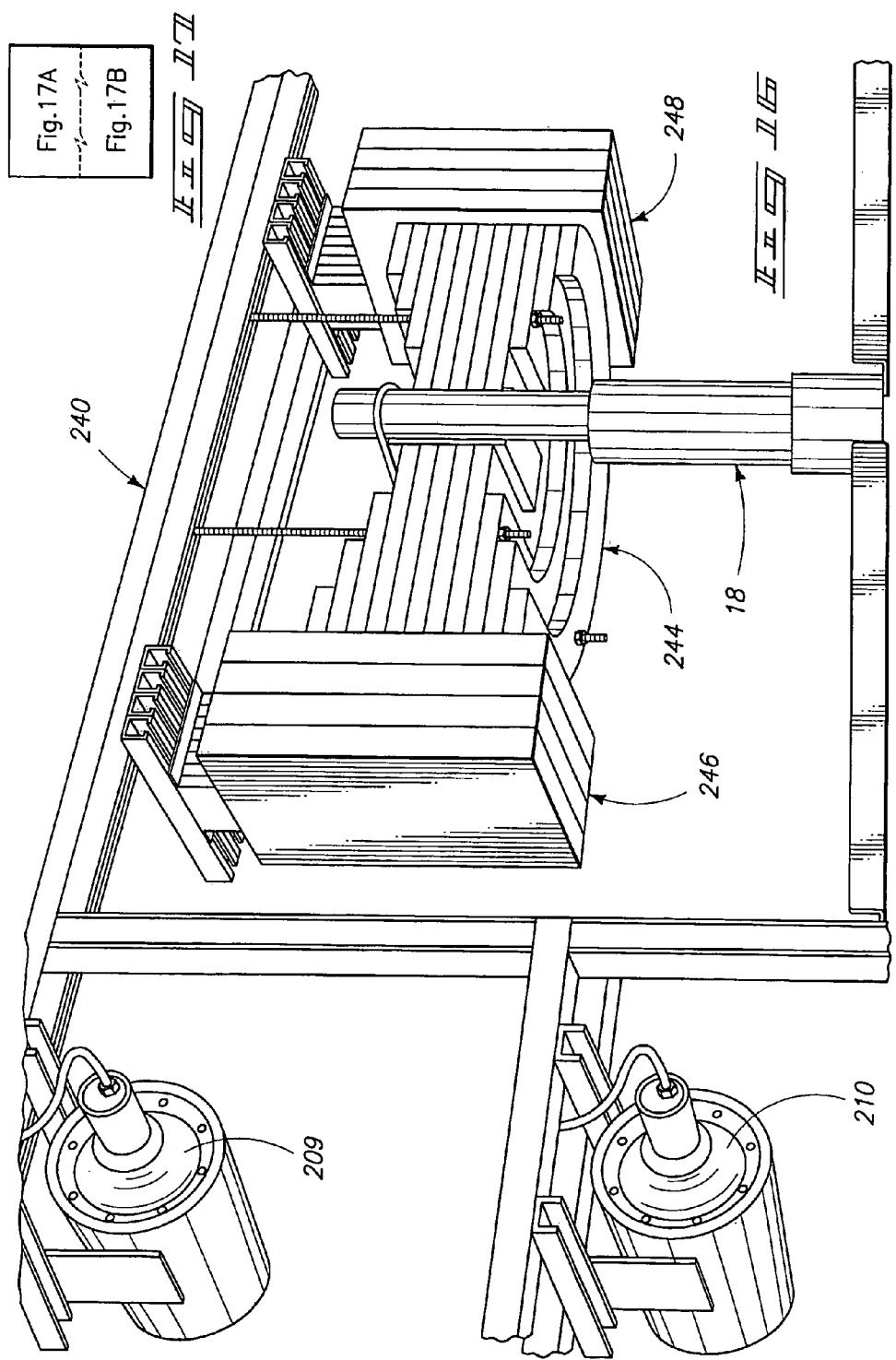

Operation Configuration

OPERATING PARAMETERS CONFIGURATION

[Detectors] [Generators] [Runtime] [Analysis]

DETECTOR PROPERTIES

| Position | Enabled | Serial Number | Name | High Voltage | Gain | LLD |
|---|---|---|---|---|---|---|
| 1 | ☑ | sn117 | Detector 1 | 850 | 0.4 | 24 |
| 2 | ☑ | sn420 | Detector 2 | 895 | 0.4 | 24 |
| 3 | ☑ | sn134 | Detector 3 | 798 | 0.4 | 24 |
| 4 | ☑ | sn406 | Detector 4 | 845 | 0.4 | 24 |
| 5 | ☑ | sn152 | Detector 5 | 855 | 0.4 | 24 |
| 6 | ☑ | sn348 | Detector 6 | 854 | 0.4 | 24 |
| 7 | ☑ | sn371 | Detector 7 | 883 | 0.4 | 24 |
| 8 | ☑ | sn373 | Detector 8 | 849 | 0.4 | 24 |
| 9 | ☑ | sn135 | Detector 9 | 803 | 0.4 | 24 |
| 10 | ☑ | sn386 | Detector 10 | 895 | 0.4 | 24 |
| 11 | ☑ | sn387 | Detector 11 | 826 | 0.4 | 24 |
| 12 | ☑ | sn389 | Detector 12 | 835 | 0.4 | 24 |
| 13 | ☑ | sn391 | Detector 13 | 855 | 0.4 | 24 |
| 14 | ☑ | sn392 | Detector 14 | 836 | 0.4 | 24 |
| 15 | ☑ | sn394 | Detector 15 | 823 | 0.4 | 24 |
| 16 | ☑ | sn395 | Detector 16 | 834 | 0.4 | 24 |

FIG. 11A

| | | | | | |
|---|---|---|---|---|---|
| 17 | ☑ | sn396 | Detector 17 | 838 | 0.4 | 24 |
| 18 | ☑ | sn421 | Detector 18 | 826 | 0.4 | 24 |
| 19 | ☑ | sn399 | Detector 19 | 872 | 0.4 | 24 |
| 20 | ☑ | sn407 | Detector 20 | 810 | 0.4 | 24 |
| 21 | ☑ | sn408 | Detector 21 | 895 | 0.4 | 24 |
| 22 | ☑ | sn409 | Detector 22 | 834 | 0.4 | 24 |
| 23 | ☑ | sn410 | Detector 23 | 835 | 0.4 | 24 |
| 24 | ☑ | sn411 | Detector 24 | 828 | 0.4 | 24 |
| 25 | ☑ | sn374 | Detector 25 | 870 | 0.4 | 24 |
| 26 | ☑ | sn413 | Detector 26 | 880 | 0.4 | 24 |
| 27 | ☑ | sn414 | Detector 27 | 850 | 0.4 | 24 |
| 28 | ☑ | sn415 | Detector 28 | 868 | 0.4 | 24 |
| 29 | ☑ | sn416 | Detector 29 | 855 | 0.4 | 24 |
| 30 | ☑ | sn417 | Detector 30 | 845 | 0.4 | 24 |
| 31 | ☑ | sn419 | Detector 31 | 830 | 0.4 | 24 |
| 32 | ☑ | sn119 | Detector 32 | 795 | 0.4 | 24 |

[APPLY] [CLOSE]

FIG. 17B

Operation Configuration

OPERATING PARAMETERS CONFIGURATION

[Detectors] [Generators] [Runtime] [Analysis]

Generator One (Master)
☑ Enabled
COM Port: COM 3 ▼
Excitation Range: 0
Excitation Value: 50
Repetition Range: 1
Repetition Value: 500
Voltage Set Point: 90
Current Set Point: 40

Generator Two (Slave)
☑ Enabled
COM Port: COM 4 ▼
Excitation Range: 0
Excitation Value: 50
Repetition Range: 1
Repetition Value: 500
Voltage Set Point: 80
Current Set Point: 45

[APPLY] [CLOSE]

FIG. 18

Operation Configuration

OPERATING PARAMETERS CONFIGURATION

[Detectors] [Generators] [Runtime] [Analysis]

Enable/Disable Settings

- ☑ Periodic Analysis [30] (sec)
- ☐ Display Hardware Error Messages
- ☐ Simulation Mode
- ☑ System Logging (Debug)
- ☑ Use Threat Level Settings in Operator GUI
- ☑ Display Generator Status

Threat Level Settings

- ⦿ Alpha [300] (runtime) [0.99] (sensitivity)
- ○ Bravo [400] (runtime) [0.99] (sensitivity)
- ○ Charlie [500] (runtime) [0.99] (sensitivity)
- ○ Delta [600] (runtime) [0.99] (sensitivity)

NOTE: Alpha parameters are used when threat levels are disabled.

Runtime Parameters

- Log File: [c:/leds/log.txt] [...]
- Data Directory: [c:/leds/] [...]
- Minimum Number of Detectors: [0]
- Minimum Number of Generators: [1]
- Maximum Generator Warmup Time: [100]
- Generator Initialization Time: [600]
- Gain Stabalization Delay: [120] (seconds)
- Progress Bar Dead Time Factor: [1.2]

[APPLY] [CLOSE]

FIG. 19

EXPLOSIVES DETECTION SYSTEM AND METHOD

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The invention relates to systems and methods for protecting against terrorism. More particularly, the invention relates to systems and methods for detecting explosives.

BACKGROUND OF THE INVENTION

There is a need for an explosive detection system to detect bombs in vehicles of various sizes, from cars to large trucks. When vehicles enter an area, such as a military base, they are inspected visually. They are perhaps inspected by a canine unit, if one is available, and many times they are not available. The inspection time must be low enough so as not to hamper traffic flow.

Currently, vehicles entering facilities such as military bases and embassies are checked for explosives by physical search, x-ray, vapor detection, or canine units.

Attention is directed to the following references: [1] P. C. Womble, G. Vourvopoulos, J. Paschal, I. Novikov, G. Chen, "Nuclear Instruments & Methods in Physics Research A 505," pp. 470-473 (2003); [2] T. Gozani, M. Elsalim, D. Strellis, D. Brown, "Nuclear Instruments & Methods in Physics Research A 505," pp. 486-489 (2003); and [3] G. Vourvopoulos, "Chemistry and Industry," pp. 297-300 (18 Apr. 1994).

BRIEF DESCRIPTION OF THE DRAWINGS

Preferred embodiments of the invention are described below with reference to the following accompanying drawings.

FIG. 5 is a screen shot of the graphical user interface of FIG. 3 during the process of interrogation.

FIG. 6 is a screen shot of the graphical user interface of FIG. 3 after a determination that no explosives are present.

FIG. 7 is a screen shot of the graphical user interface of FIG. 3 after a determination that explosives are present.

FIG. 8 is a diagrammatical map illustrating the general locations of detectors.

FIG. 9 is a high level flowchart illustrating logic implemented by the control system.

FIG. 10 is a flowchart illustrating calibration of FIG. 9 in greater detail.

FIG. 16 illustrates spacing between components in a rack, in one particular embodiment.

FIG. 17 is a screen view of an example of an administrator level screen using which operating parameters of detectors can be set.

FIG. 18 is a screen view of an example of an administrator level screen using which operating parameters of generators can be set.

FIG. 19 is a screen view of an example of an administrator level screen using which operating parameters such as threat level settings and other items, as shown, can be set.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention provides an explosives detection system and method that detects an explosive inside a vehicle by use of multiple detectors. A combination of detectors is used to detect an explosive in a short amount of time.

Figure 1:
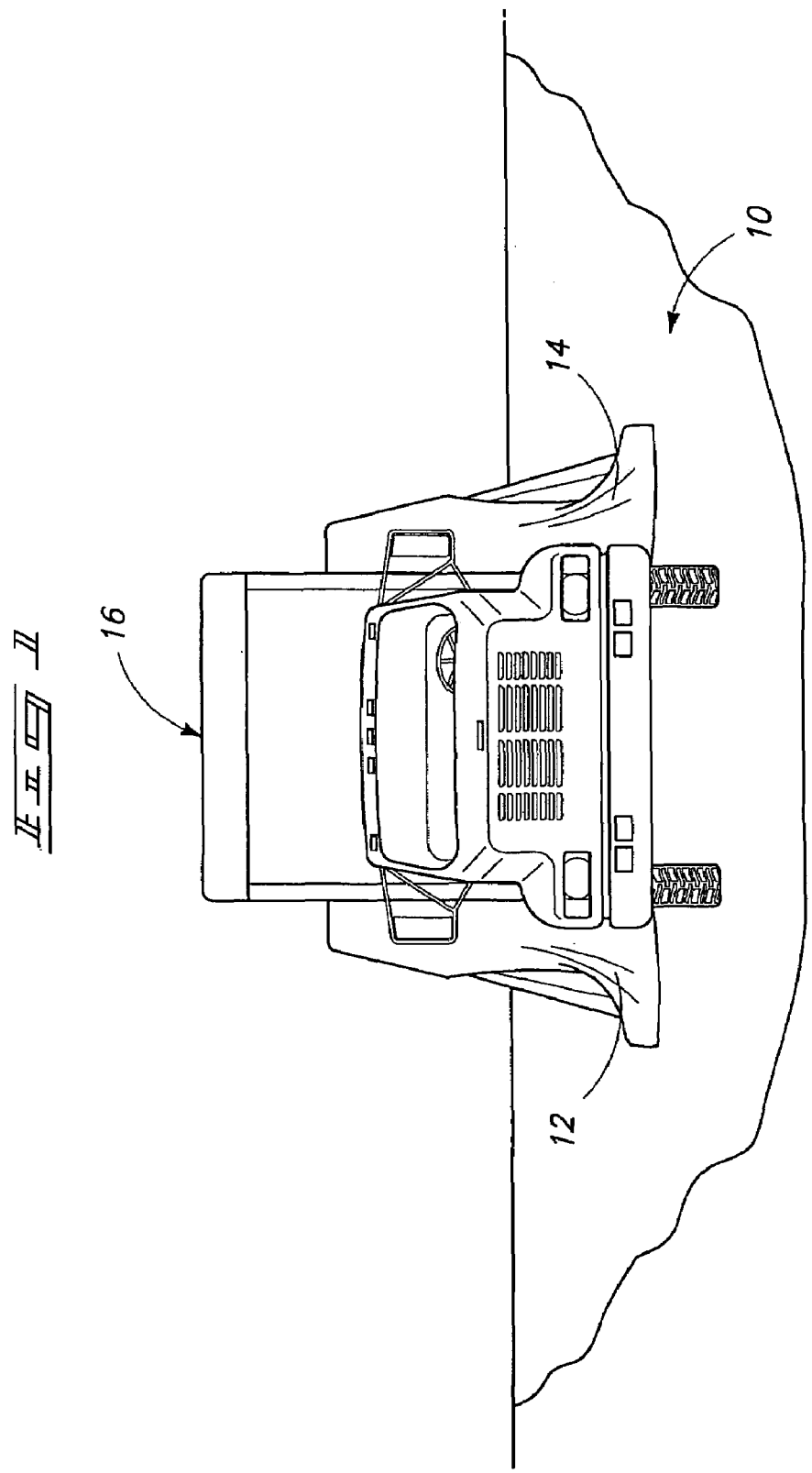
FIG. 1 is a front view of a system embodying various aspects of the invention.
Figure 2:
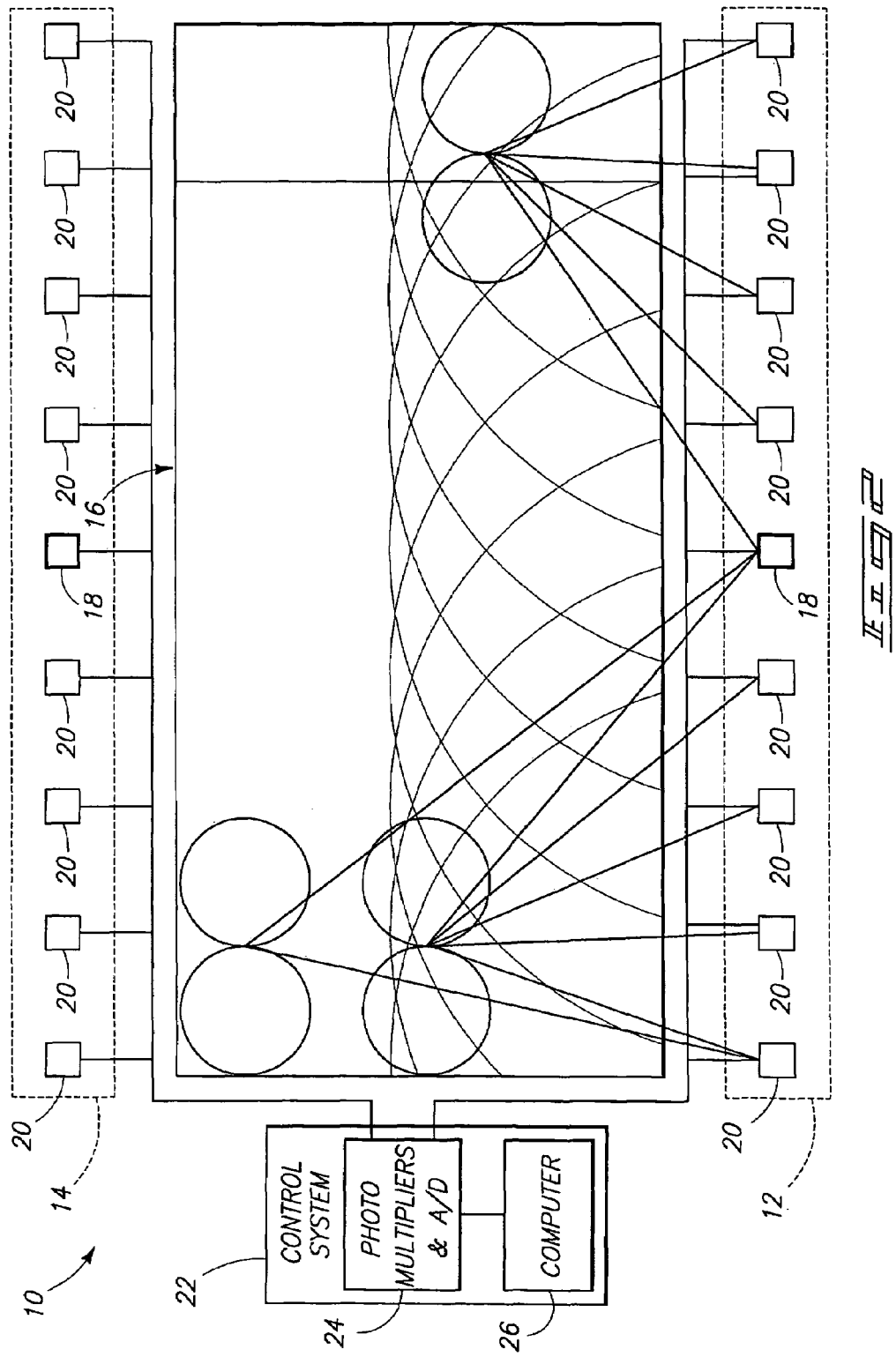
FIG. 2 is a top diagrammatical view of the system of FIG. 1.

FIG. 1 shows a system 10 for detecting explosive, embodying various aspects of the invention. The system 10 has many anti-terrorism applications including, for example, detecting vehicles carrying explosives, e.g., into restricted areas or military bases. In the illustrated embodiment, the system 10 includes two racks, 12 and 14, capable of being moved to each side of a subject vehicle 16. Each rack 12 and 14 includes a neutron generator 18 and an array of detectors 20, such as NaI detectors (FIG. 2). The two neutron generators 18 are pulsed and synchronized. A controller, which can be defined, for example, by a laptop computer, controls the racks 12 and 14. The control software is easily operable by minimally trained staff. The system 10 was developed to detect explosives in a vehicle within a short time. More particularly, in the illustrated embodiment, the system 10 can detect explosives in a medium size truck within a 5-minute measurement time.

In the illustrated embodiment as shown in FIG. 2, the system 10 uses two pulsed D-T neutron generators 18 to interrogate the vehicle 16. In the illustrated embodiment, the neutron generators are Genie 16-C neutron generators available from Sodern, 20 Descartes Avenue, Limeil Brevannes, France. Other neutron generators could be employed. While other embodiments are possible, in the illustrated embodiment, 14 MeV neutrons are produced. High-energy neutrons penetrate the subject vehicle 16 where they interact with any explosive in or on the vehicle. Some of these neutrons are thermalized within the explosive and are captured by the nitrogen atoms. More particularly, some of the neutrons inelastically scatter off various elements until they eventually thermalize and are captured. These interactions release signature gamma rays from the explosive, which are measured by the large array of NaI detectors 20. Explosives are chemically distinct from innocuous materials. When a neutron is captured by a nitrogen atom, a 10.8 MeV gamma ray is released. The gamma ray spectra, acquired using the detectors 20, are analyzed to identify the major elemental components of the explosives. While other numbers could be employed, in the illustrated embodiment, there are thirty-two NaI 5×5 detectors.

After the detection period is complete, all the spectra from the detectors are automatically calibrated and gain matched to the same linear equation. After this is done, the spectra can be added together. If the detection time is long enough, the detectors do not have to be added and can have enough statistics to indicate detection of explosive. The adding of detectors allows for a shorter detection time. The detectors are added together in groups ranging from 4 to 8 detectors. The group members are determined by the closest detectors to any particular point in the suspect vehicle. For example, to detect an explosive located in the far back of the truck, the detectors on both ends of the racks are the closest and will be the most likely to detect the explosives. By having a wide variety of groups, the sensitivity of detection is increased. Also, by not adding all the detectors together, which would include detectors that are out of range of target, the signal to background ratio is kept high. In some embodiments, any one detector does not have enough statistics to conclusively determine whether an explosive is present or not. By adding several detectors together, there will be enough statistics to determine whether an explosive is present or not. The grouping of detectors is selected so as to group together detectors that are a similar distance from a certain spot in the vehicle.

An alarm condition is provided when the system detects certain elements in certain minimum quantities.

In the illustrated embodiment, a control system 22, coupled to the neutron generators 18 and detectors 20, is used to control operation of the neutron generators 18 and process and analyze data received from the detectors 20, and give a result. The control system 22, in various embodiments, may also monitor the health of the system, monitor the interrogation progress, and give a result in a clear, simple, go or no-go format.

In operation, the inspection of a subject vehicle 16 begins with the vehicle driving into position between the two identical racks 12 and 14. After the driver exits the vehicle and the radiation exclusion zone, the racks 12 and 14 are moved close to the vehicle. This is referred to as pinching the vehicle. In the illustrated embodiment, there is a, for example, 2 mrem per hour radiation exclusion zone which is approximately 90 feet long by 60 feet wide. The operator of the system 10 is located outside this zone. In the illustrated embodiment, the operator is up to 4000 feet away. In the illustrated embodiment, each rack includes an array of 5-inch diameter by 5-inch deep sodium iodide (5×5 NaI) detectors, defining the detectors 20, and shielding. After the vehicle 16 is pinched, the neutron generators are turned on and warmed up. After warm-up, the neutron interrogation begins. In the illustrated embodiment, the warm-up time is approximately 85 seconds.

In the illustrated embodiment, the control system 22 includes photomultiplier tube bases 24 and spectrum analyzers for gamma ray spectroscopy. The control system 22 further includes a processor coupled to the photomultipliers 24. More particularly, in the illustrated embodiment, the photomultipliers 24 are defined by digiBASEs™ available from Ortec, 801 South Illinois Avenue, Oak Ridge, Tenn. 37830 (see http://www.ortec-online.com/pdf/digibase.pdf). Each digiBASE also includes an integrated bias supply, preamplifier and digital multi-channel analyzer. In the illustrated embodiment, the processor is defined by a computer 26, such as a portable or laptop computer. More particularly, in the illustrated embodiment, all the digiBASEs are connected to the control laptop computer 26 by USB cables through USB hubs, which provide power to the bases 24. In the illustrated embodiment, the only other connection on the digiBASE is a gating input. Data are collected and stored by the digiBASEs during the interrogation. Periodically during the interrogation the stored data are read from all the digiBASEs at a USB rate. Because the data are read in spectrum form from the digiBASEs, the speed of the USB is not crucial. Alternative connection types and alternatives to digiBASEs could also be employed.

When the interrogation is complete, a spectrum is read from each detector 20. The spectra are then calibrated. In the illustrated embodiment, the calibration is automatic, and is accomplished, for example, by using always-present gamma rays including Hydrogen at 2.2 MeV. Spectra with calibration coefficients outside preset ranges are rejected and not analyzed. After the initial individual calibration occurs, spectra are shifted to one common calibration, which allows the spectra to be added together. Calibration is described in greater detail below. The spectra are then analyzed for signature gamma rays. Depending on the results of the analysis, the operator is alerted with an "All Clear" message indicating no explosives detected or a "Suspect Cargo" message indicating that explosives were detected. In the illustrated embodiment, a simple, very clear go or no-go output is displayed that can be easily understood by an operator without the operator needing to reach his or her own conclusion or needing to analyze results. At an administrator-defined interval during the interrogation, preliminary results can be given. The entire interrogation and analysis time, including the neutron generator warm-up time, is less than 300 seconds (5 minutes), in the illustrated embodiment.

In some embodiments, the system 10 includes a feature that allows the operator to change the sensitivity of the system in response to changes in facility alert status. In some embodiments, the desired sensitivity is selected by choosing one of multiple threat levels (e.g., Alpha, Bravo, Charlie, or Delta). Each level corresponds to a different balance of count time, false positive and false negative rates.

In the illustrated embodiment, one of the design considerations for the system 10 was to maximize the signal-to-noise ratio. To maximize the signal, highly efficient 5×5 NaI detectors with factory quoted resolutions ranging from 6.5% to 7.4% using a 137Cs source were chosen. A disadvantage of the NaI detectors is that their gain changes with neutron activation. This is counteracted by the gain stabilizer built into the digiBASE and by the calibration steps described below in greater detail. Gain changes of the NaI detectors due to temperature are much less significant than due to the neutron activation, and are also minimized because material surrounding the detectors reduces the temperature fluctuations.

In the illustrated embodiment, the detectors 20 are distributed over the length of a typical mid-size delivery truck. In the illustrated embodiment, on each side of the subject vehicle, there are sixteen detectors plus a neutron generator distributed over about sixteen and a half feet with the detectors in two rows spaced apart. This arrangement means there will be a detector close to the explosives no matter where they are located in the subject vehicle. Other spacings are possible. In the illustrated embodiment, the arrangement of the detectors was selected to be able to cover the entire cargo area of a mid-sized truck (up to 20 ft). But there is a distance limit from the neutron generators where the neutron flux drops off to a level that doesn't allow enough production of nitrogen gamma rays to be detected. The detectors should also be close enough to each other so that they can be summed together so that a statistically significant amount of nitrogen can be detected.

Signal strength can be further improved by raising the flux of neutrons interrogating the vehicle. Adding more neutron generators or using higher flux neutron generators can achieve this. Both of these options are costly. The addition of a neutron generator would raise the cost of a system significantly and running a neutron generator at a higher neutron flux output would reduce the lifetime of the neutron generator tube, increasing maintenance costs.

Another way of increasing the signal-to-noise ratio is to reduce the background seen by the detectors. In the illustrated embodiment, a shielding configuration is provided that blocks the detectors from neutrons from the generators as well as unwanted gamma rays produced from surrounding materials. This shielding reduces the neutron flux on the detectors as well as the radiation footprint of the system.

In the illustrated embodiment, there are two shielding configurations. One configuration shields the neutron generators 18 from the detectors 20, and another shields the detectors 20 from as much background as is possible.

The shielding around the neutron generators includes, for example, 12" of 5% borated poly, which reduces the neutron flux from the neutron generators by as much as 90%. The neutrons interacting with the poly creates a large amount of 2.2 MeV gamma rays.

Figure 15:
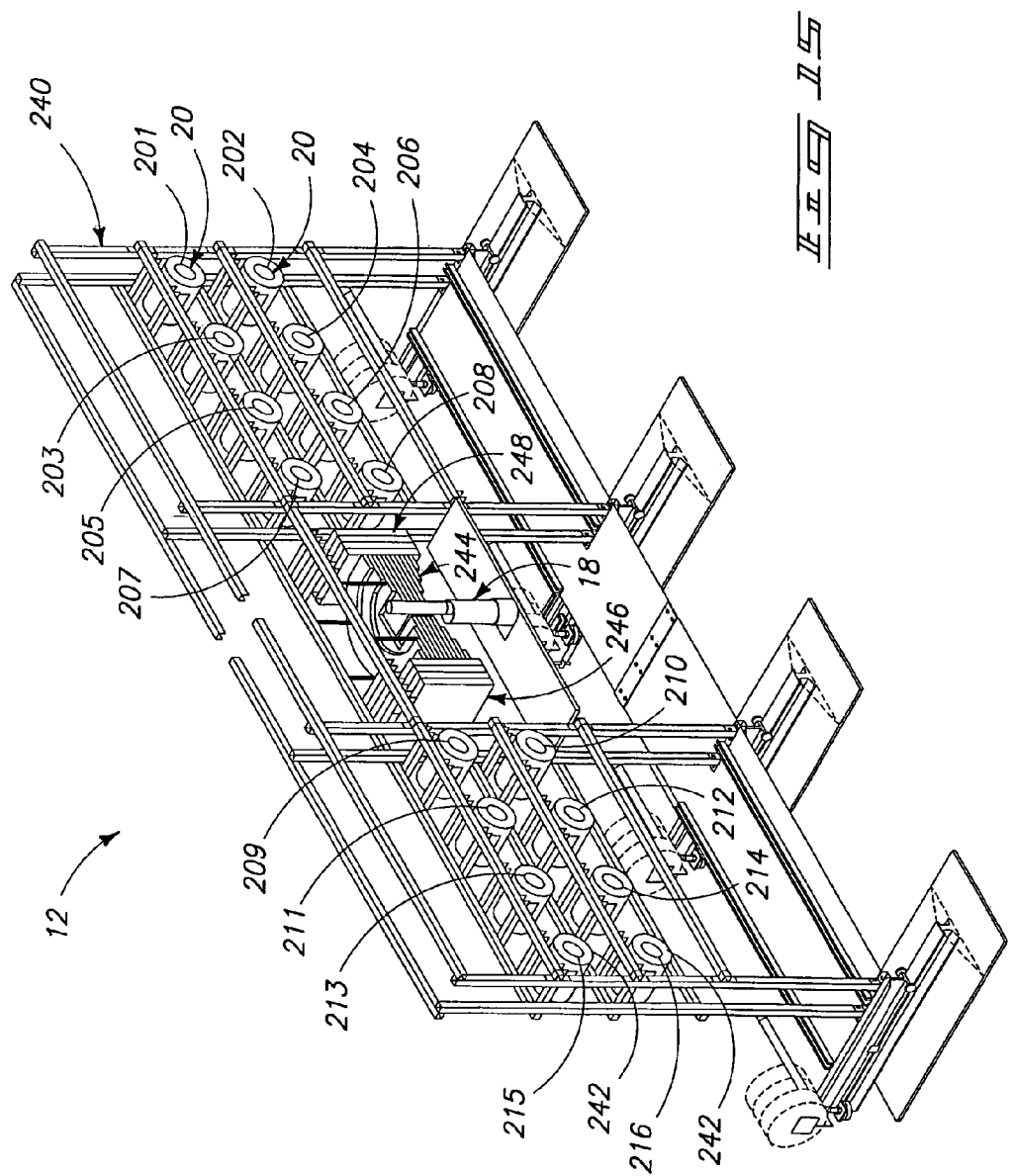
FIG. 15 is a cut-away perspective view of one of the racks.

In the illustrated embodiment, 4" of additional bismuth shielding is placed between the poly and the detectors 20 to reduce this flux of gamma rays. The shielding around the sides of the detectors includes, for example, 1" of bismuth. This reduces the unwanted gamma rays from any interaction the neutrons have with the surrounding material. FIG. 15 is a cut-away perspective view of one of the racks and shows the shielding.

In the illustrated embodiment, the control system 22 has a graphical user interface defined by the computer 26. The graphical user interface provides different screens for different levels of users. For example, in the illustrated embodiment, the system has two levels of users, operator and administrator. An operator is, for example, allowed to check the status/health of the system and, of course, run the system. The administrator sets up the system originally and has control over all preferences and settings.

Figure 3:
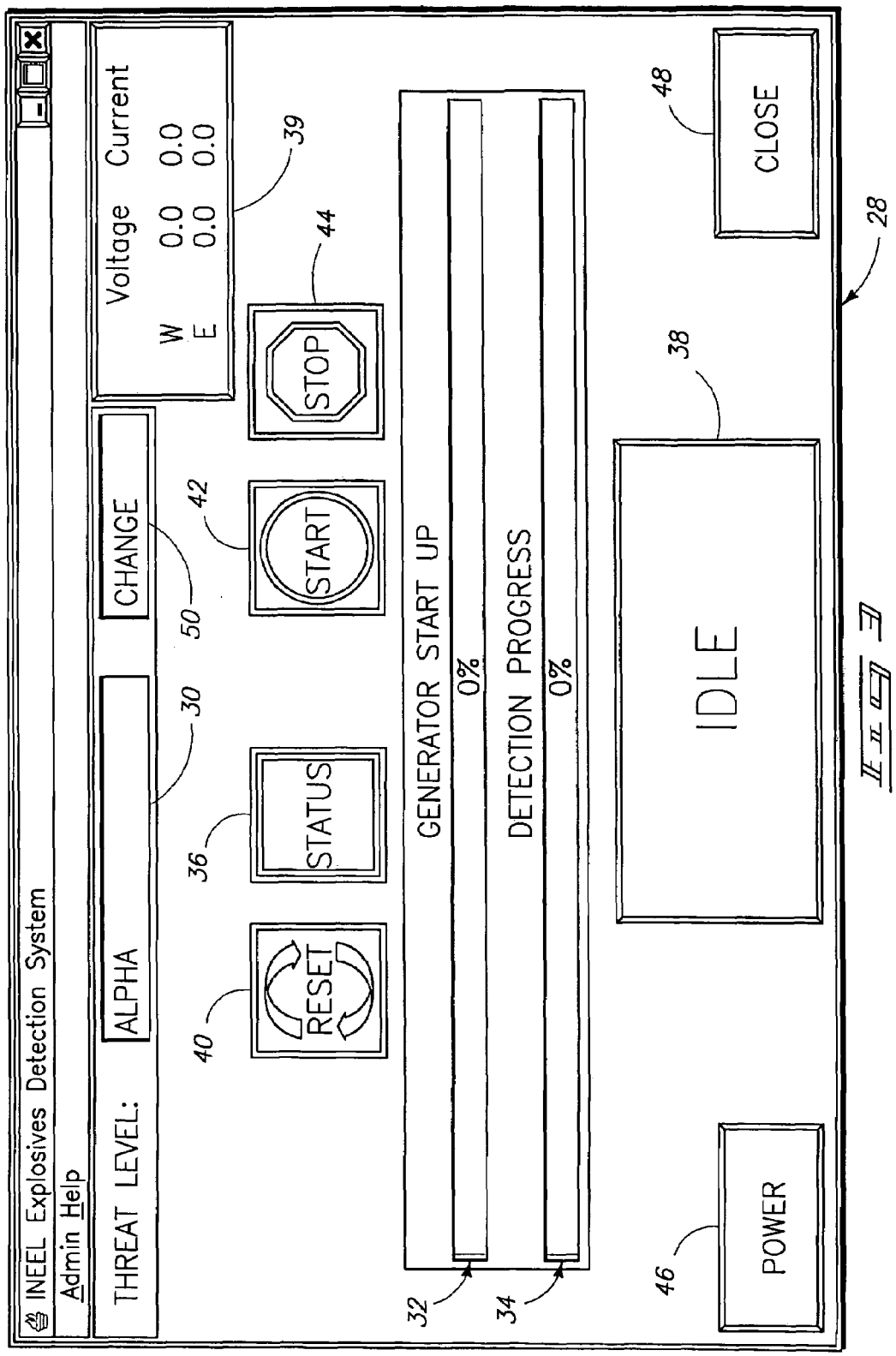
FIG. 3 is a screen shot of a graphical user interface of the system of FIG. 1.

FIG. 3 shows but one example of a main graphical user interface (GUI) screen 28, which the operator would see after the system 10 is first powered on. The screen 28 was intentionally simplified allowing the operator to quickly determine the status of the system 10. The screen 28 indicates, in an area 30, the threat level. The screen 28 indicates, in areas 32 and 34, the progress of the interrogation. The screen 28 indicates, in an area 36, status. The screen 28 also indicates, in an area 39, the voltages and currents for two neutron generators 18. The status area or button 36 displays the health of the system using colors, in the illustrated embodiment; green indicates that the control computer 26 is communicating with all detectors 20 and generators 18; yellow indicates loss of connection with at least one detector 20; and red indicates loss of communication with at least a threshold number of detectors 20. The administrator of the system sets this threshold. The system has the ability to operate even with the loss of detectors but must have at least a threshold amount. The screen 28 indicates results in an area 38. This will display one of the following: Idle, Interrogating, Processing, All Clear, or Suspect Cargo. If, at any time, the control computer 26 loses communication with the neutron generators 18 for more than a predetermined amount of time, such as a few seconds, the neutron generators 18 will shut down. Also, as a fail-safe, if the system 10 takes longer than a predetermined amount of time for an interrogation, the neutron generators 18 and possibly other parts of the system 10 will shutdown. The screen 28 also includes a reset button 40, which causes the screen 28 to refresh; a start button 42, for starting an interrogation; a stop button 44, for terminating an interrogation; a power button 46, for turning power on to the detectors and neutron generators by setting their various parameters, and a close button 48, for closing the graphical user interface 28 and allowing the computer 26 to be used as a conventional computer. The screen 28 also includes a change button 50 that allows the Threat Level to be changed.

Figure 4:
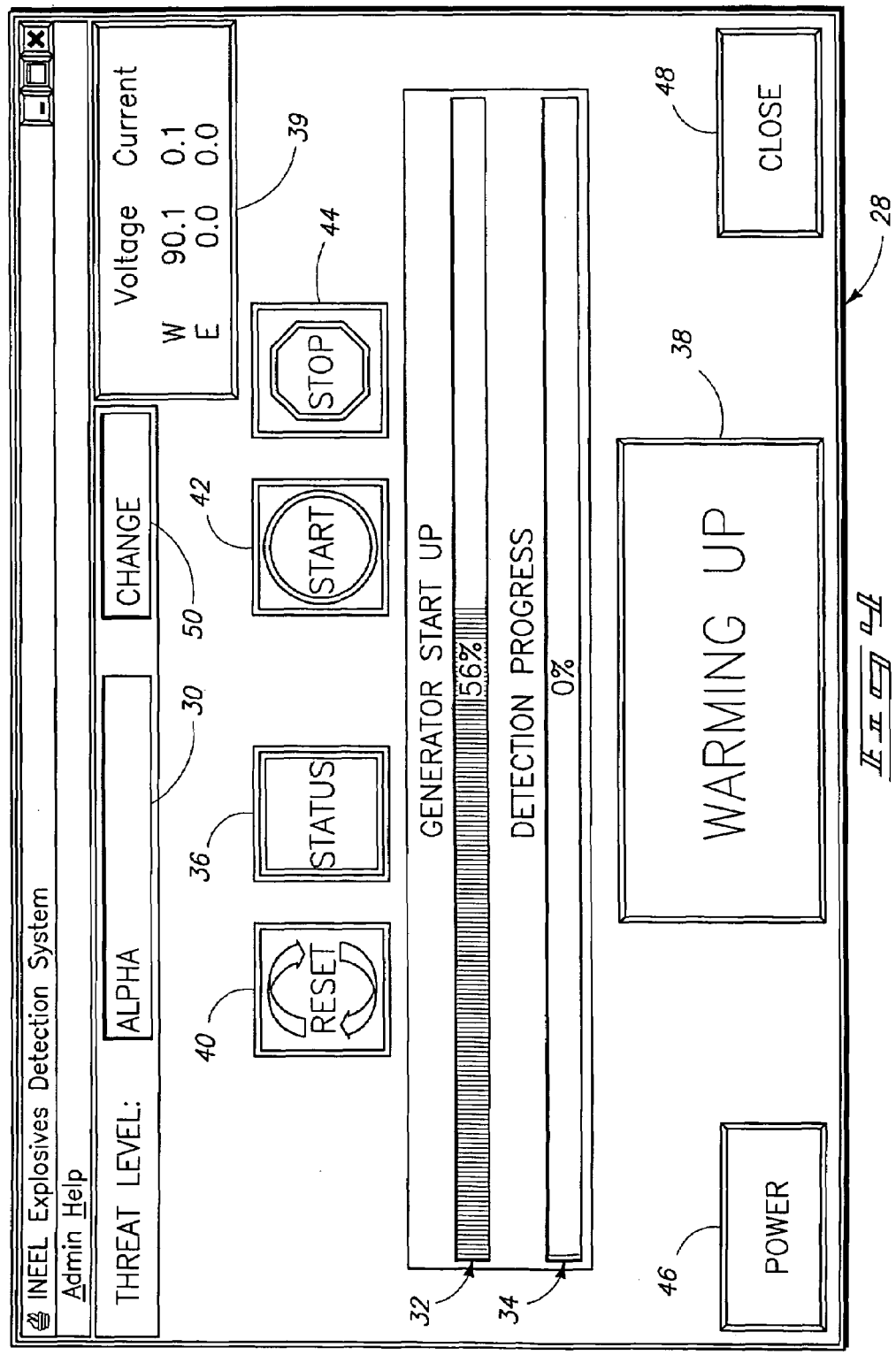
FIG. 4 is a screen shot of the graphical user interface of FIG. 3 during the process of neutron generator start-up.

FIG. 4 is a screen shot of the graphical user interface 28 during neutron generator start-up (during warm-up).

FIG. 5 is a screen shot of the graphical user interface 28 during detection using the detectors 20.

FIG. 6 is a screen shot of the graphical user interface 28 after detection using the detectors 20, where no explosives have been detected. "All Clear" is displayed in area 38.

FIG. 7 is a screen shot of the graphical user interface 28 after detection using the detectors 20, where explosives have been detected. "Suspect Cargo" is displayed in area 38.

FIG. 17 is a screen view of an example of an administrator level screen using which operating parameters of detectors can be set.

FIG. 18 is a screen view of an example of an administrator level screen using which operating parameters of generators can be set.

FIG. 19 is a screen view of an example of an administrator level screen using which operating parameters such as threat level settings and other items, as shown, can be set.

FIG. 8 is a diagrammatical map illustrating the general locations of detectors. By grouping multiple detectors together, the system is able to detect smaller quantities in a shorter amount of time. Also, because of the way the detectors are grouped, they are able to interrogate an entire twenty foot truck. While other groupings are possible, in the illustrated embodiment, groups are defined as follows, each detector 20 being more particularly numbered as shown in FIG. 8:

Group 1 includes detectors 201, 202, 203, 204, 205, and 206;

Group 2 includes detectors 203, 204, 205, 206, 207, and 208;

Group 3 includes detectors 205, 206, 207, 208, 209, and 210;

Group 4 includes detectors 207, 208, 209, 210, 211, and 212;

Group 5 includes detectors 209, 210, 211, 212, 213, and 214;

Group 6 includes detectors 211, 212, 213, 214, 215, and 216;

Group 7 includes detectors 217, 218, 219, 220, 221, and 222;

Group 8 includes detectors 219, 220, 221, 222, 223, and 224;

Group 9 includes detectors 221, 222, 223, 224, 225, and 226;

Group 10 includes detectors 223, 224, 225, 226, 227, and 228;

Group 11 includes detectors 225, 226, 227, 228, 229, and 230;

Group 12 includes detectors 227, 228, 229, 230, 231, and 232;

Group 13 includes detectors 201, 203, 205, and 207;

Group 14 includes detectors 203, 205, 207, and 209;

Group 15 includes detectors 205, 207, 209, and 211;

Group 16 includes detectors 207, 209, 211, and 213;

Group 17 includes detectors 209, 211, 213, and 215;

Group 18 includes detectors 202, 214, 216, and 218;

Group 19 includes detectors 204, 206, 208, and 210;

Group 20 includes detectors 206, 208, 210, and 212;

Group 21 includes detectors 208, 210, 212, and 214;

Group 22 includes detectors 210, 212, 214, and 216;

Group 23 includes detectors 217, 219, 221, and 223;

Group 24 includes detectors 219, 221, 223, and 225;

Group 25 includes detectors 221, 223, 225, and 227;

Group 26 includes detectors 223, 225, 227, and 229;

Group 27 includes detectors 225, 227, 229, and 231;

Group 28 includes detectors 218, 220, 222, and 224;

Group 29 includes detectors 220, 222, 224, and 226;

Group 30 includes detectors 222, 224, 226, and 228;

Group 31 includes detectors 224, 226, 228, and 230;

Group 32 includes detectors 226, 228, 230, and 232;

Group 33 includes detectors 201, 202, 203, and 204;

Group 34 includes detectors 203, 204, 205, and 206;

Group 35 includes detectors 205, 206, 207, and 208;

Group 36 includes detectors 207, 208, 209, and 210;

Group 37 includes detectors 209, 210, 211, and 212;

Group 38 includes detectors 211, 212, 213, and 214;

Group 39 includes detectors 213, 214, 215, and 216;

Group 40 includes detectors 217, 218, 219, and 220;

Group 41 includes detectors 219, 220, 221, and 222;

Group 42 includes detectors 221, 222, 223, and 224;

Group 43 includes detectors 223, 224, 225, and 226;

Group 44 includes detectors 225, 226, 227, and 228;

Group 45 includes detectors 227, 228, 229, and 230;

Group 46 includes detectors 229, 230, 231, and 232;

Group 47 includes detectors 201, 203, 205, 217, 219, and 221;

Group 48 includes detectors 203, 205, 207, 219, 221, and 223;

Group 49 includes detectors 205, 207, 209, 221, 223, and 225;

Group 50 includes detectors 207, 209, 211, 223, 225, and 227;

Group 51 includes detectors 209, 211, 213, 225, 227, and 229;

Group 52 includes detectors 211, 213, 215, 227, 229, and 231;

Group 53 includes detectors 202, 204, 206, 218, 220, and 222;

Group 54 includes detectors 204, 206, 208, 220, 222, 224;

Group 55 includes detectors 206, 208, 210, 222, 224, and 226;

Group 56 includes detectors 208, 210, 212, 224, 226, and 228;

Group 57 includes detectors 210, 212, 214, 226, 228, and 230;

Group 58 includes detectors 212, 214, 216, 228, 230, and 232;

Group 59 includes detectors 201, 202, 203, 204, 205, 206, 207, and 208;

Group 60 includes detectors 203, 204, 205, 206, 207, 208, 209, and 210;

Group 61 includes detectors 205, 206, 207, 208, 209, 210, 211, and 212;

Group 62 includes detectors 207, 208, 209, 210, 211, 212, 213, and 214;

Group 63 includes detectors 209, 210, 211, 212, 213, 214, 215, and 216;

Group 64 includes detectors 217, 218, 219, 220, 221, 222, 223, and 224;

Group 65 includes detectors 219, 220, 221, 222, 223, 224, 225, and 226;

Group 66 includes detectors 212, 222, 223, 224, 225, 226, 227, and 228;

Group 67 includes detectors 223, 224, 225, 226, 227, 228, 229, and 230;

Group 68 includes detectors 225, 226, 227, 228, 229, 230, 231, and 232;

Group 69 includes detectors 201, 202, 217, and 218;

Group 70 includes detectors 201, 202, 203, 204, 217, 218, 219, and 220;

Group 71 includes detectors 215, 216, 231, and 232;

Group 72 includes detectors 213, 214, 215, 216, 229, 230, 231, and 232;

Group 73 includes detectors 214, 215, 216, 230, 231, and 232;

Group 74 includes detectors 213, 215, 216, 229, 231, and 232;

Group 75 includes detectors 213, 214, 216, 229, 230, and 232;

Group 76 includes detectors 213, 214, 215, 229, 230, and 231;

Group 77 includes detectors 201, 202, 203, 217, 218, and 219;

Group 78 includes detectors 201, 202, 204, 217, 218, and 220;

Group 79 includes detectors 201, 203, 204, 217, 219, and 220; and Group 80 includes detectors 202, 203, 204, 218, 219, and 220.

Other groupings, either overlapping or not overlapping, can be used in alternative embodiments. An advantage of this grouping of detectors is the ability to detect smaller quantities in a shorter amount of time.

FIG. 9 is a flowchart illustrating operation of the control system 22, in accordance with various embodiments.

FIG. 10 is a flowchart illustrating the calibration of FIG. 9 in greater detail.

In step 50, operation starts.

In step 52, after the power button 46 is clicked, detectors 20 are powered on, and neutron generators 18 are initialized. After performing step 52, the controller proceeds to step 54.

In step 54, an initialization or gain/stabilization run is performed. The detectors are activated by neutrons, and in this step, they are activated. Spectra tend to shift, and it is desired to stabilize them. In the illustrated embodiment, gain stabilization is a feature of the digiBASEs. Gain stabilization means finding a peak and providing the location and width of the peak to the digiBASE so that the digiBASE can keep that peak from shifting (e.g., along the horizontal axis in any of FIGS. 11-14). Gain stabilization could also be performed if digiBASEs are not employed. In the illustrated embodiment, after the gain stabilization is complete, the reset button 40 must be pressed before proceeding. After performing step 54, the controller proceeds to step 56.

In step 56, the controller waits for the start button 42 to be pressed. After the start button 42 is pushed, the interrogation starts. After performing step 56, the controller proceeds to step 58.

In step 58, warm-up of the neutron generators 18 is initiated. In the illustrated embodiment, this takes about 85 seconds, other neutron generators are warmed up more quickly. During warm-up, voltage is on and current comes up, and pressure in tubes in the neutron generators increases. After performing step 58, the controller proceeds to step 60.

In step 60, after the neutron generators have reached full power and are emitting neutrons, data acquisition is started, using the detectors 20. After performing step 60, the controller proceeds to step 62.

In step 62, after the data acquisition is complete, spectra are downloaded from the detectors 20 and the neutron generators 18 are turned off. After performing step 62, the controller proceeds to step 64.

In step 64, the spectra are calibrated. This step is described in greater detail below in connection with FIG. 10. After performing step 64, the controller proceeds to step 66.

In step 66, spectra are gain shifted to a common calibration. This refers to moving peaks to common channels or energy levels so they can be added. The term channel refers to the horizontal axis in any of FIGS. 11-14. Different positions along the horizontal axis are different channels having different energy levels (energy level increases as you move to the right of the origin). Because of potential drift, it is not always known, at first, which channel corresponds to which energy level. Calibration is performed, as shown in FIG. 9, to determine which channels correspond to which energy levels.

After performing step 66, the controller proceeds to step 68.

In step 68, all spectra are summed together for each pre-defined group. The summing is performed for each of the groups 1-80 described above in connection with FIG. 8. After performing step 68, the controller proceeds to step 70.

In step 70, nitrogen detection analysis is performed on each summed group. This refers to identifying a nitrogen region, and performing statistical analysis to determine if counts are above a background level in a region approximately 100 channels wide near 10.8 MeV. There are actually three overlapping peaks, which may not be distinguishable, so a range of channels is analyzed. After performing step 70, the controller proceeds to step 72.

In step 72, a determination is made as to whether a minimum number of groups are above the nitrogen detection threshold. The minimum number of groups may be three, for example. If so, the controller proceeds to step 74. If not, the controller proceeds to step 76.

In step 74, the controller informs the operator that explosives have been detected, by, for example, causing a message such as "Suspect Cargo" to be displayed. In alternative embodiments, an audible message is provided in addition to or instead of the display.

In step 76, the controller informs the operator that explosives have not been detected, by, for example, causing a message such as "All Clear" to be displayed. In alternative embodiments, an audible message is provided in addition to or instead of the display.

FIG. 10 describes step 64 in greater detail.

Figure 11:
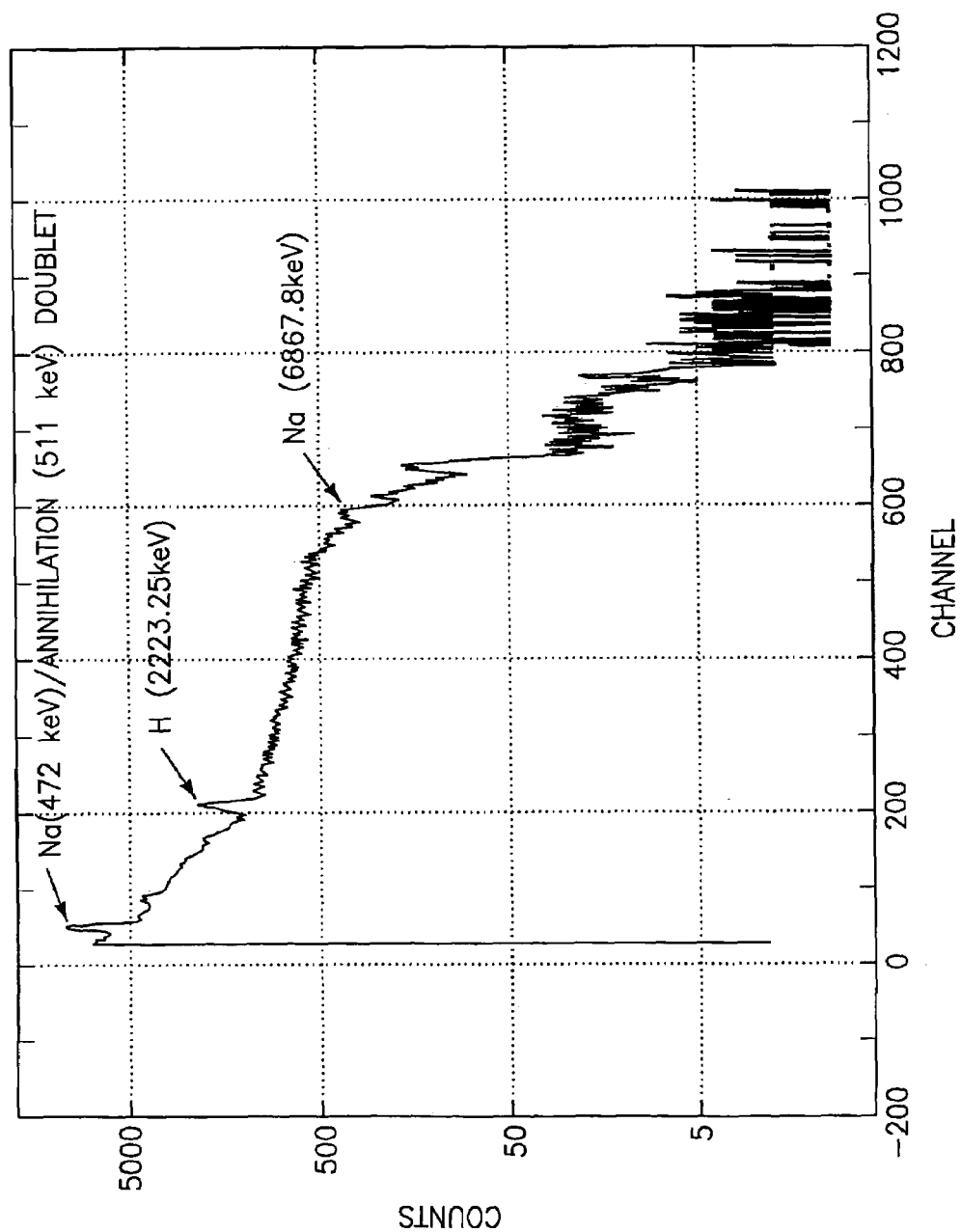
FIG. 11 is graph showing an example of a typical NaI spectrum, which includes a Na/Annihilation doublet, a Hydrogen peak, and a Na peak.

In step 100, regions containing peaks are defined, and the peaks themselves are generally defined using Gaussian curve fitting. FIG. 11 is graph showing an example of a typical NaI spectrum. Gaussian curve fitting is known in the art and is described, for example, in the following reference: Debertin, K. and Helmer, R. G., (1988) "Gamma- and X-Ray Spectrometry with Semiconductor Detectors", Amsterdam, The Netherlands Elsevier Science B. V.

After performing step 100, the controller proceeds to step 102.

Figure 12:
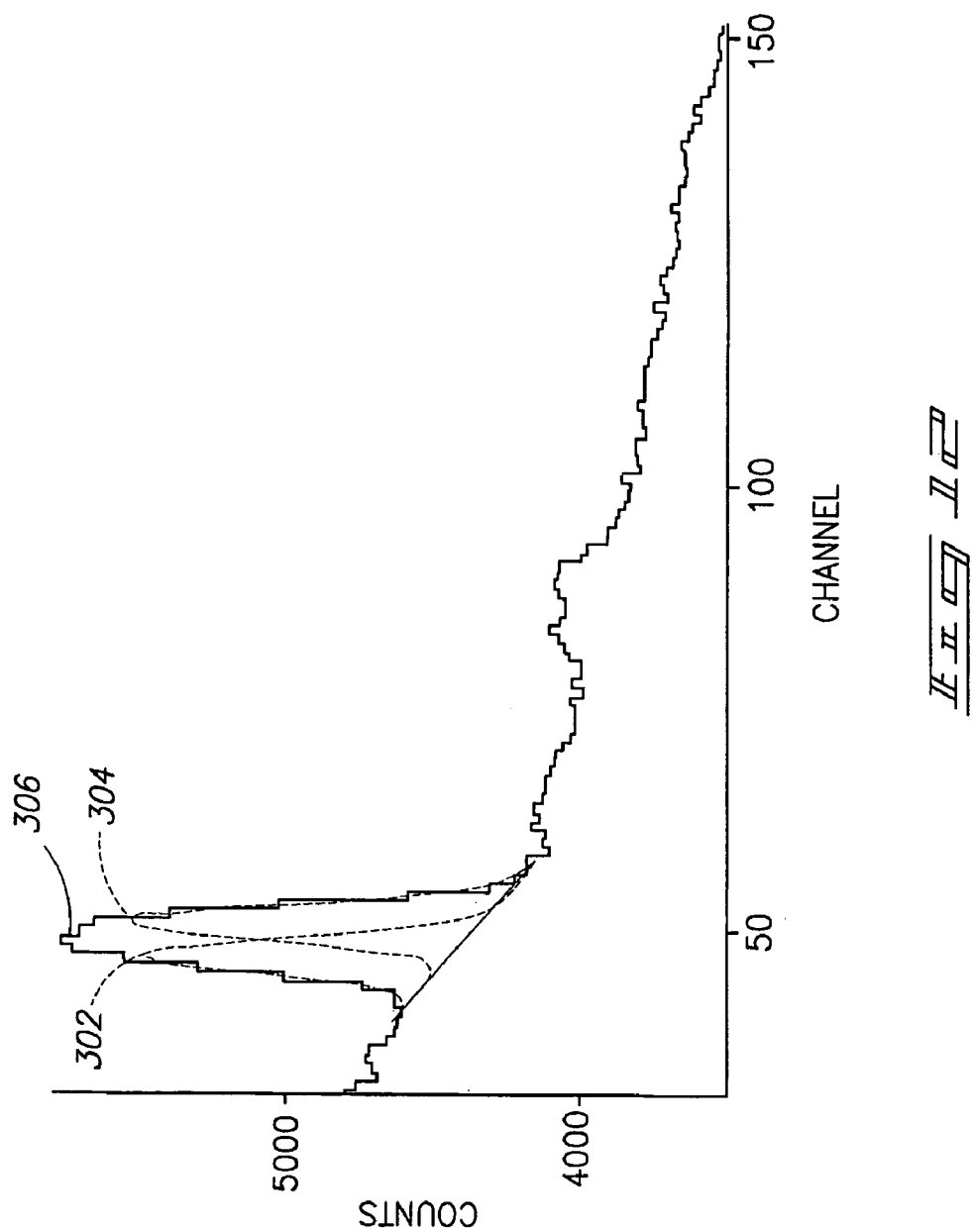
FIG. 12 is a graph illustrating Gaussian peak fitting to a doublet defined by a sodium peak and an annihilation peak.

In step 102, a doublet is located in the annihilation region. A doublet is a pair of overlapping peaks that look like a single peak. As shown in FIG. 12, there is a sodium peak 302 and an annihilation peak 304 which together define doublet 306. When a positron is slowed down to essentially zero energy, it will interact with an electron, the two will annihilate, and usually two photons of 511 keV will be produced. This 511 keV gamma ray, produced by the annihilation of the positron and electron, forms what is called the annihilation peak. After performing step 102, the controller proceeds to step 104.

In step 104, a predetermined energy value (e.g., 511 kiloelectron Volts or keV) is assigned to the centroid channel for one (e.g., the rightmost) peak in the doublet. An annihilation peak is known to have an energy value of 511 keV and the rightmost peak in the doublet is the annihilation peak 304. The leftmost peak in the doublet is a sodium peak 302. After performing step 104, the controller proceeds to step 106.

In step 106, a predicted H2223 peak centroid channel is calculated using, for example, a library derived equation. By H2223, what is meant is a Hydrogen peak at approximately 2223.25 keV. More particularly, in step 108, using a library of spectra with known calibrations, prediction equations are developed for a hydrogen 2223.25 keV peak location based on an annihilation peak location and a 6867.8 keV Na (sodium) peak. After finding the annihilation and sodium peaks (or doublet), the location of the hydrogen peak can be predicted using the prediction equations.

After performing step 106, the controller proceeds to step 110.

Figure 13:
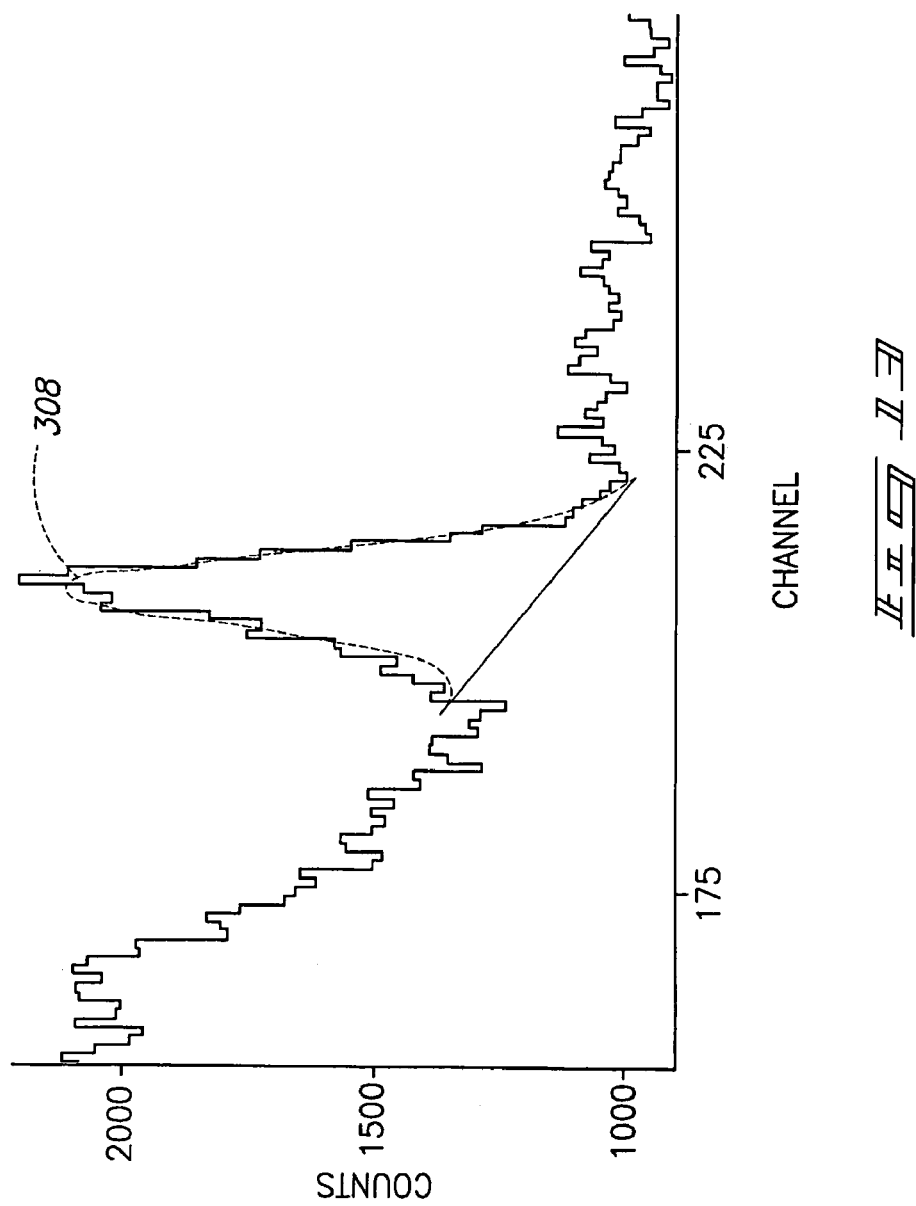
FIG. 13 is a graph illustrating Gaussian peak fitting to a hydrogen peak.

In step 110, the "best" peak is found in a region surrounding the predicted H2223 peak location. FIG. 13 is a graph illustrating Gaussian peak fitting to the hydrogen 2223 peak 308. A predetermined energy value (e.g., 2223.25 keV) is assigned to the centroid channel for the best peak. After performing step 110, the controller proceeds to step 112.

In step 112, the controller calculates a linear Na6868 peak centroid channel by a linear fit to the annihilation and hydrogen peaks. After performing step 112, the controller proceeds to step 114.

In step 114, a nonlinearity adjustment is applied to the linear Na6868 peak predicted centroid using the library-derived equation from step 108. After performing step 114, the controller proceeds to step 116.

Figure 14:
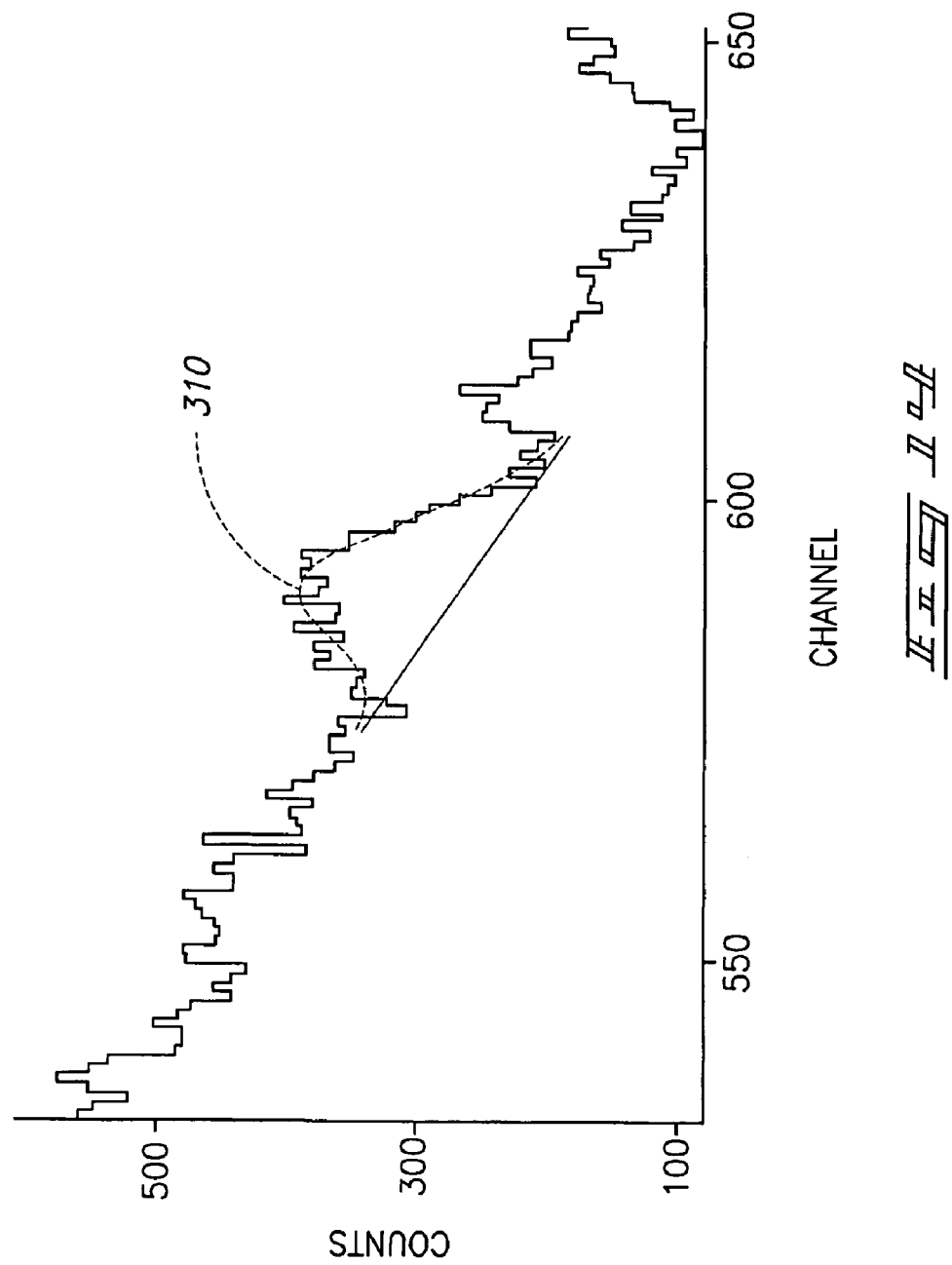
FIG. 14 is a graph illustrating Gaussian peak fitting to a sodium 6867 peak.

In step 116, the controller finds the best peak in a region surrounding the predicted Na6868 peak location. FIG. 14 is a graph illustrating Gaussian peak fitting to a sodium 6868 peak 310. The controller assigns 6867.8 keV to the centroid channel for the best peak.

In step 118, a quadratic equation is fit to the annihilation, hydrogen and sodium peak centroids and energy values to produce the final energy calibration equation. There are many possible ways of fitting a quadratic equation. In the illustrated embodiment, a least squares fit is used. Least squares fits are described, for example, in the following reference: Debertin, K. and Helmer, R. G., (1988) "Gamma- and X-Ray Spectrometry with Semiconductor Detectors," Amsterdam, The Netherlands: Elsevier Science B. V.

Using a library of existing calibrated spectra to derive prediction equations is believed to be a significant improvement in energy calibration, which results in increased calibration speed and improved detection capability. The form and actual numerical values for the derived adjustment equations may vary from one application to the next, as well as might the method of deriving the equation from the library of spectra.

An example, using real numbers will now be provided for each of the steps. As an example, only, in step 100, the region containing the annihilation peak may be found, using Gaussian curve fitting, to be the region containing channel 48. In this example, the peak region boundaries may be found to be, for example, from channel 30 to channel 65.

Continuing the example, in step 102, the sodium/annihilation doublet peak is found within the annihilation region and the doublet is fit using Gaussian peak fitting. Let us say that, in the example, the annihilation peak centroid channel is found to be at channel 53.9. Continuing the example, in step 104, 511 keV is assigned to channel 53.9.

Continuing the example, in step 106, the Predicted Hydrogen Peak Centroid Channel is calculated using the library derived equation:

Predicted Hydrogen Peak Centroid Channel=66.4+
2.7*Annihilation Peak Centroid Channel=212.0.

In step 110, the region is then found from the region list containing the Predicted Hydrogen Peak Centroid Channel. In the example, the region from channel 201 to 236 is found. Gaussian peak fitting is performed to fit the hydrogen peak. In the example, the Hydrogen Peak Centroid Channel is found to be at channel 218.7. 2223.25 keV is assigned to this channel.

Continuing the example, in step 112, the slope and intercept are calculated for a linear prediction of the Sodium Peak Centroid Channel as follow (the slash symbol "/" symbolized division and the asterisk symbol "*" symbolizes multiplication):

Slope=(218.7−53.97)/(2223.25−511)=0.096

Intercept=53.97−Slope*511=4.79

The Linear Sodium Peak Centroid Channel Prediction is then calculated as follows:

Linear Sodium Peak Centroid Channel
Prediction=Intercept+(Slope*6867.8)=665.5

Continuing the example, in step 114, a nonlinear adjustment is applied to the Linear Sodium Peak Centroid Channel Prediction using library derived equation to get the Predicted Sodium Peak Centroid Channel, as follows:

Predicted Sodium Peak Centroid Channel=Linear
Sodium Peak Centroid Channel Prediction+
10.25+(−0.11*Linear Sodium Peak Centroid
Channel Prediction)=601.7

In step 116, in the example, a region (e.g., forty channels wide) is formed on either side of the Predicted Sodium Peak Channel and the sodium peak is fitted using Gaussian peak fitting. A Sodium Peak Centroid Channel is found at channel 606.7. 6867.8 keV is assigned to this channel.

Continuing the example, in step 118, a quadratic least squares calculation is fit to the (channel, keV) pairs for the annihilation, hydrogen, and sodium peaks to get the energy calibration equation: Energy in keV=−15.7+9.6*Channel+ 0.0029*Channel*Channel. The above was but one example, to better enable one of ordinary skill in the art to understand the flowcharts. Other examples are, of course, possible depending on actual readings. In alternative embodiments, other quadratic equation fitting methods can be employed, other than least squares.

In some embodiments, the control system is configured to execute computer program code embodied in a computer readable medium. The program code, when executed in the control system, causes the control system to perform the steps of FIGS. 9 and 10. The computer readable medium can be any form of RAM, ROM, or EPROM, including CD-ROMs, DVDs, floppy disks, hard drives, memory sticks, tapes, etc. In some embodiments, the program code is embodied in a carrier wave transmitted over a computer network, such as over the Internet. In other words, in some embodiments, computer code which defines the steps of FIGS. 9 and 10 can be delivered to a customer or user by transmission over a network such as a LAN, WAN, or the Internet.

FIG. 15 is a cut-away perspective view of one of the racks 12 and shows the detectors 201-216 and neutron generator 18 supported by a frame 240. Insulation 242, e.g., bismuth of about 0.5-1 inch thick, surrounds each detector 201-216. Insulation, such as 5% borated poly 244 is provided around the neutron generator 18. Additional insulation 246 and 248, such as 4 inch thick bismuth, is provided between the neutron generator 18 and the detectors. While other dimensions are possible, in the illustrated embodiment, the distance from the center of one detector to the center of an adjacent detector to the left or right is 1.5 feet; for example, the distance from the center of detector 202 to the center of adjacent detector 204 is 1.5 feet. One of detectors is 1.5 feet above the adjacent row; for example, detector 206 is 1.5 feet above adjacent detector 205. The horizontal distance from the center of detector 208 or 207 to the center of the neutron generator 18 is 3 feet. Other spacings are, of course, possible, but this spacing has been designed in particular for interrogation of a mid-sized truck.

FIG. 16 illustrates spacing between components in a rack, in one particular embodiment.

The system 10 can be used for military base, border, check point, building and embassy security.

The system 10 is a non-destructive, non-intrusive, and non-contact system. In other words, the system 10 can interrogate a vehicle without need to open the vehicle and risk the life of the inspector.

The system 10 can detect explosives in a variety of sizes of vehicles, including mid-size delivery trucks, and can detect explosives concealed within a vehicle. The system 10 has a measurement and analysis time of 5 minutes or less. In some embodiments, the system 10 uses commercial off the shelf components as much as possible. Minimal training is needed to operate the system 10. Straightforward go/no go reporting is provided. The system 10 can detect explosives such as ammonium nitrate and fuel oil (ANFO), pentaerythrite tetranitrate (PETN), composition 4 (C4), trinitrotoluene (TNT), etc. While the preferred embodiments have been described in connection with detection of nitrogen, in alternative embodiments, other or additional elements are detected that may be helpful in deciding whether there are explosives present.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An explosive detection method comprising:
providing a neutron generator and a plurality of gamma ray detectors adjacent to a vehicle;
providing a control system coupled to the neutron generators and gamma ray detectors;
using the control system, causing the neutron generators to generate neutrons;
defining a plurality of groups comprising different combinations of the detectors;
responsive to the generation of the neutrons, generating a plurality of outputs using the detectors of the groups, wherein the outputs individually correspond to one of the groups, and further comprising, for individual ones of the groups, combining data generated by the detectors of the respective individual groups responsive to the generation of the neutrons and to provide the outputs of the respective individual groups, and wherein the analyzing comprises analyzing the outputs of the respective individual groups after the combining;
analyzing the outputs; and
selectively indicating presence of an explosive in the vehicle using the analysis.

2. A method in accordance with claim 1 and further comprising, displaying a message to an operator to provide the selective indication of the presence of the explosive.

3. A method in accordance with claim 1 wherein the detectors are NaI detectors.

4. A method in accordance with claim 1 wherein the control system performs Gaussian peak fitting to define peak regions.

5. A method in accordance with claim 1 wherein the analyzing comprises determining whether individual ones of the outputs of the respective groups indicate the presence of an explosive.

6. A method in accordance with claim 5 wherein the selectively indicating presence comprises indicating the presence of the explosive if a certain number of the groups indicate the presence of an explosive.

7. A method in accordance with claim 1 wherein the analyzing comprises analyzing individual ones of the outputs with respect to a threshold, and the selectively indicating presence comprises indicating the presence of the explosive if the outputs of a certain number of the groups individually exceed the threshold.

8. A method in accordance with claim 1 wherein the providing the detectors comprises providing the detectors in an arrangement adjacent to substantially an entire side of the vehicle.

9. A method in accordance with claim 1 wherein the providing the detectors comprises providing the detectors in an arrangement to monitor substantially an entire side of the vehicle at the same moment in time.

10. A method in accordance with claim 1 wherein the defining comprises defining the groups to include the detectors which are located relative to a plurality of respective different locations of the vehicle.

11. A method in accordance with claim 10 wherein the defining at least one of the groups comprises defining the at least one of the groups to include the detectors which are located substantially the same distance from a respective one of the locations of the vehicle.

12. A method in accordance with claim 10 wherein the defining at least one of the groups comprises defining the at least one of the groups to include the detectors which are located closest to and substantially the same distance from a respective one of the locations of the vehicle.

13. A method in accordance with claim 1 wherein the generating the outputs comprises generating the outputs comprising spectra and wherein the analyzing the outputs comprises performing gamma ray spectroscopy on the spectra.

14. A method in accordance with claim 1 wherein the providing the neutron generator and the gamma ray detectors comprises providing a first rack comprising the neutron generator and the gamma ray detectors adjacent to one side of the vehicle, and further comprising providing a second rack adjacent to another side of the vehicle, and wherein the second rack comprises an additional neutron generator and a plurality of additional gamma ray detectors coupled with the control system.

15. An explosive detection system comprising:
a rack, configured to be provided on adjacent to one side of the vehicle, the rack including a neutron generator and a plurality of gamma ray detectors; and
a control system coupled to the neutron generator and gamma ray detectors, the control system being configured to cause the neutron generator to generate neutrons and to perform gamma ray spectroscopy on spectra read by the gamma ray detectors, responsive to the generation of neutrons, to look for a signature indicative of presence of an explosive, wherein the control system performs the gamma ray spectroscopy on the spectra individually comprising a spectrum resulting from a combination of spectral readings from plural ones of the gamma ray detectors.

16. A system in accordance with claim 15 and further comprising a display coupled to the control system and configured to, responsive to the spectroscopy, display a message to an operator with a conclusion as to whether or not explosives are present.

17. A system in accordance with claim 15 wherein the rack comprises a moveable housing.

18. A system in accordance with claim 15 wherein the detectors are NaI detectors.

19. A system in accordance with claim 15 and further comprising defining a group of the detectors, and adding together the spectral readings from the detectors in a the group before the performing the gamma ray spectroscopy.

20. A system in accordance with claim 15 wherein the control system performs Gaussian peak fitting to define peak regions.

21. A system in accordance with claim 15 wherein the control system performs the gamma ray spectroscopy on the spectra corresponding to different groups of the detectors.

22. A system in accordance with claim 21 wherein the detectors of the groups are located relative to a plurality of respective different locations of the vehicle.

23. A system in accordance with claim 22 wherein the detectors of an individual one of the groups are located substantially the same distance from a respective one of the locations of the vehicle.

24. A system in accordance with claim 22 wherein the detectors of an individual one of the groups are located closest to and substantially the same distance from a respective one of the locations of the vehicle.

25. A system in accordance with claim 21 wherein the control system is configured to indicate presence of an explosive if the gamma ray spectroscopy on the spectra of a certain number of the groups indicates the presence of the explosive.

26. A system in accordance with claim 15 wherein the detectors are arranged in the rack to be adjacent to substantially an entire side of the vehicle when the rack is provided adjacent to the vehicle.

27. A system in accordance with claim 15 wherein the detectors are arranged in the rack to monitor substantially an entire side of the vehicle at the same moment in time when the rack is provided adjacent to the vehicle.

28. A system in accordance with claim 15 further comprising another rack, adjacent to another side of the vehicle, and including a neutron generator and a plurality of gamma ray detectors which are coupled with the control system.

* * * * *